Sept. 6, 1966 K. D. BRIAN ET AL 3,270,880
SIZING, GRADING AND SORTING DEVICE FOR THIN
SKIN VEGETABLES OR FRUITS
Filed Aug. 20, 1963 3 Sheets-Sheet 1

INVENTORS
KLEBER D. BRIAN
BUDD JONES
HAROLD A. O'NEAL

BY
ATTORNEY

INVENTORS
KLEBER D. BRIAN
BUDD JONES
HAROLD A. O'NEAL

INVENTORS
KLEBER D. BRIAN
BUDD JONES
HAROLD A. O'NEAL

BY
ATTORNEY

# United States Patent Office 3,270,880
Patented Sept. 6, 1966

3,270,880
SIZING, GRADING AND SORTING DEVICE FOR THIN SKIN VEGETABLES OR FRUITS
Kleber Dessic Brian, Pixley, Budd Jones, Visalia, and Harold Arthur O'Neal, Pixley, Calif., assignors of one-quarter to L. M. Clark, Earlimart, Calif.
Filed Aug. 20, 1963, Ser. No. 303,344
8 Claims. (Cl. 209—73)

This invention relates to a sizing, grading and sorting device for thin skin vegetables or fruits.

The device of this invention includes photo-electric cells for grading the vegetables or fruits both as to size and color, and also for defects appearing on the vegetables or fruit.

While the machine of this invention has been assembled for use with potatoes and will be described in connection therewith, the same, of course, can be adjusted to be used on other vegetables or fruits.

The size of the vegetable or fruit covers both height and length. This grading by length is used especially where potatoes of the Idaho type are graded and sorted.

As will be seen from the drawings forming part of this application, the same comprises a series of power driven belts with photo-electric cells mounted above the same to remove given size vegetables or fruits from said belts to other belts where the sized products are distributed as to size into given bins for packaging for the market, providing the sized products are sound, according to market standards.

Other objects and advantages of the invention will appear from the following description when read in connection with the accompanying drawings and its scope will be pointed out in the appended claims.

Figure 1:
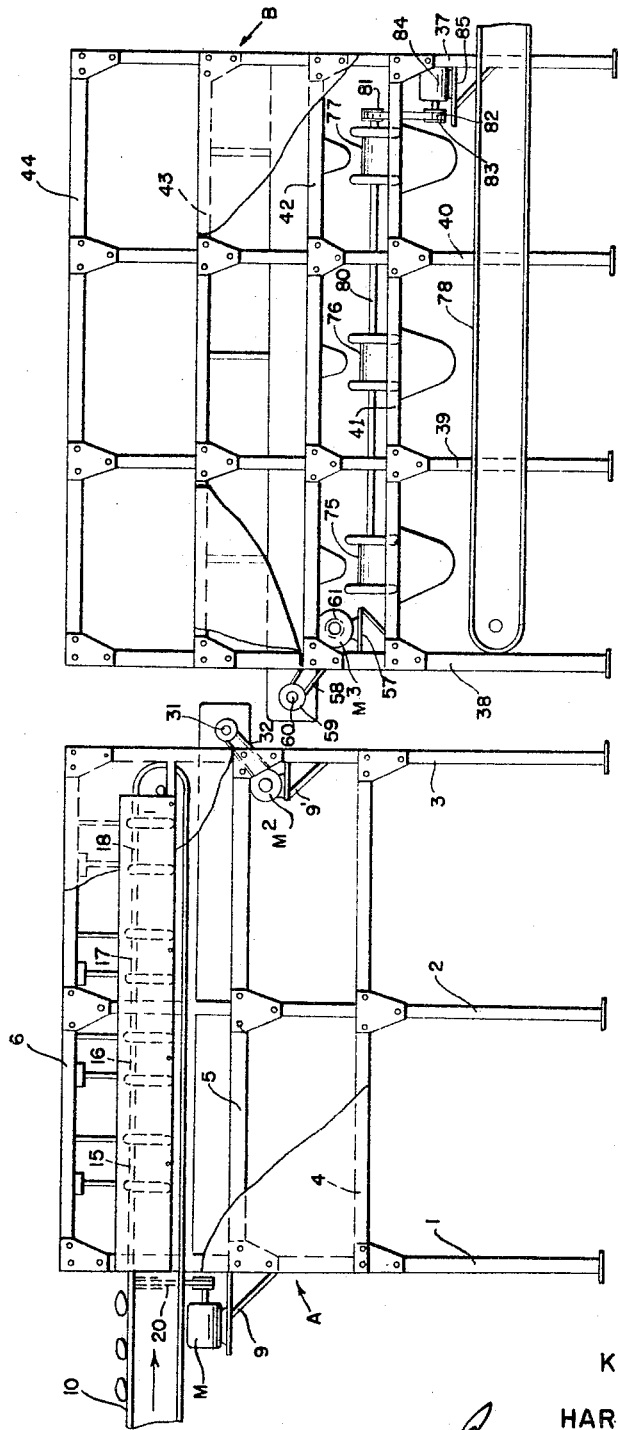
FIG. 1 is a front elevation of the sizing, grading and sorting device of the invention.

The structural frame members for the sizer A, as shown in FIG. 1, comprise at each end thereof the corner uprights 1 and 3 and the intermediate upright 2, connected by horizontal members 4, 5 and 6. This construction is duplicated on both ends of the machine.

Figure 2:
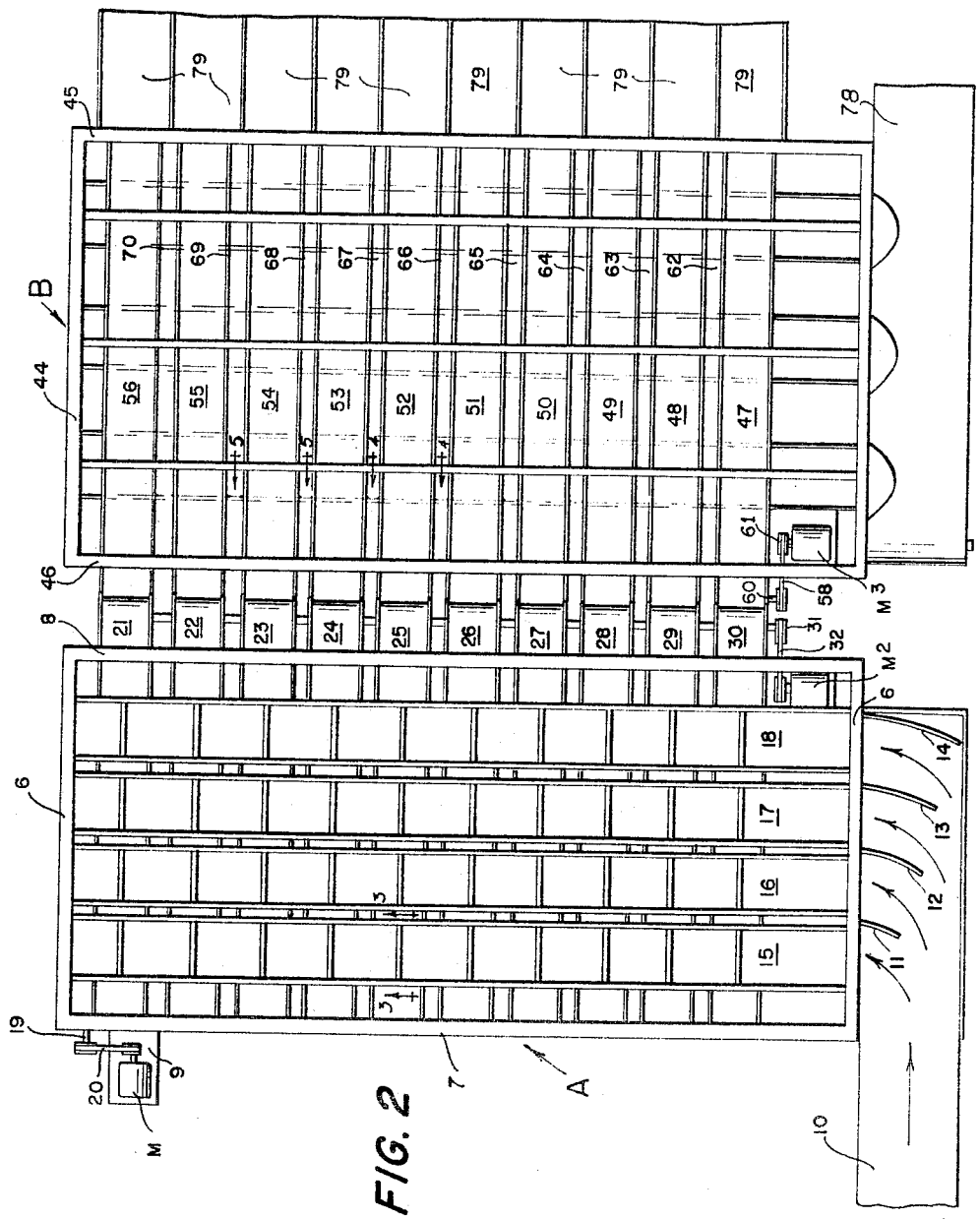
FIG. 2 is a top plan view thereof.

As will be seen in FIG. 2, the tops of the ends of the machine are connected by cross members 7 and 8.

As will be seen from FIGS. 1 and 2 of the drawings, the products being sized and graded enter the sizer A by means of a wide belt 10. The products being sized are removed from the belt 10 by fingers 11, 12, 13 and 14 projecting progressively over said belt 10 and are transferred to live belts 15, 16, 17 and 18 running at right angles to the said belt 10.

The live belts 15, 16, 17 and 18 are trained over pulleys mounted on shaft 19, said shaft 19 being driven by electric motor M supported on bracket 9 attached to upright 1 on the far end of the supporting structure. The belt 20 connects the pulley on the motor M and the pulley on the shaft 19 to furnish the drive therebetween.

Mounted under live belts 15 to 18 inclusive are a series of live belts 21 to 30 inclusive, running at right angles to said belts 15, 16, 17 and 18, said belts 21 to 30 all being mounted on pulleys, said pulleys being attached to shaft 31 and driven by motor $M^2$ through a drive belt 32. The motor $M^2$ is mounted on bracket $9^1$ attached to structural upright 3.

Figure 3:
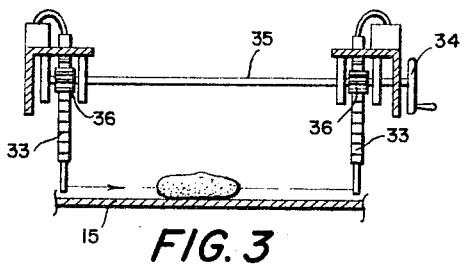
FIG. 3 is a section on line 3—3 of FIG. 2.
Figure 6:
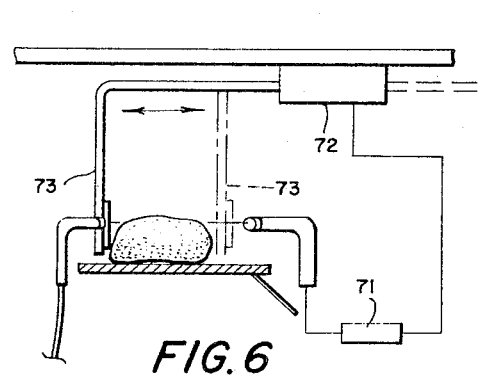
FIG. 6 is a showing of one of the photo-electric cells and the ejector arm controlled by said photo-electric cell for removing the product being sized or graded from travelling belts.
Figure 7:
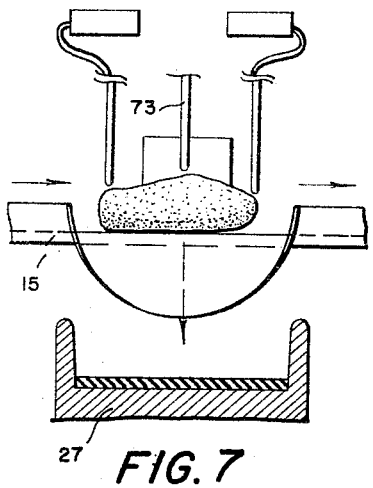
FIG. 7 shows the sizing arrangement governed by the photo-electric cell and light and the kick-off to a live belt below.

As will be seen in FIG. 1, over each of the belts 15 to 18 is a photo-electric cell arrangement similar to the arrangement shown in FIGS. 3 and 6, said cells being mounted so that the same will act to cause the discharge of a product on one of the belts 21 to 30, that is, according to size of the product.

As will be seen in FIG. 3, the photo-electric cell and light are shown as being positioned above the sizer belts and the height of adjustment for the same over the belt is through racks 33 and a hand wheel 34 connected to a rod 35 having gears 36 thereon which gears mesh with racks 33. Thus the hand wheel 34 will control the photo-electric cell and light used in connection therewith.

The height of the product on the belt passing between the photo-electric cell and its light, will control the operation of the cell and the kick-off operated thereby.

This is because if the depth of the product on the belt is such that the same projects above the light beam between the photo-electric cell and its light this will cause the photo-electric cell which governs the solenoid to operate and cause the kick-off to operate, as shown in FIG. 6 of the drawings.

At this point it should be stated that in the sizer and grader the photo-electric cells are placed so that the cells are highest above the belts where the product first enters the belt and thereafter are lowered in a gradual manner so that the largest of the products being sized or graded are removed first from the belt and the smaller of the product remain on the belt to be kicked off according to their graduated size.

The grader B shown at the right in FIGS. 1 and 2 comprises a structure of end uprights 37 and 38 and intermediate uprights 39 and 40, and end uprights 37 and 38 and the intermediate uprights 39 and 40 being connected by horizontal structural members 41, 42, 43 and 44. This construction is duplicated on both ends of the grader B.

Figure 5:
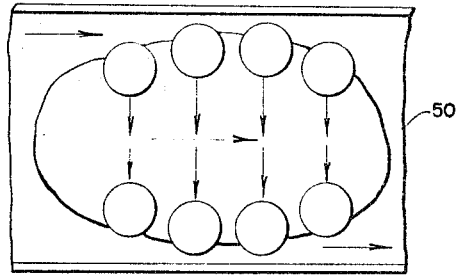
FIG. 5 is a top plan view of a section of a belt with the photo-electric cells and their respective lights arranged directly across and above the belt.

In FIG. 5 the photo-electric cells are shown with their eyes directed towards their respective lights to thereby gauge for size the product moving in the direction indicated by the arrow on belt 50.

The end uprights 37 and 38 are connected by structural members 45 and 46, as seen in FIG. 2. Between the horizontal members 42 and 43 are mounted a series of belts 47, 48, 49 50, 51, 52, 53, 54, 55 and 56, said belts and the pulleys therefor being driven by a motor $M^3$, said motor being mounted on bracket 57 supported on upright 38. The drive from motor $M^3$ is through a drive belt 58 stretched between pulley 59 attached to shaft 60 and pulley 61 attached to the shaft of motor $M^3$.

Figure 4:
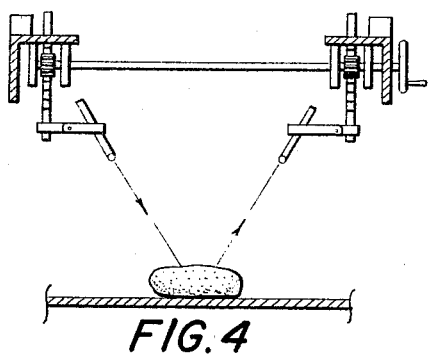
FIG. 4 is a section on line 4—4 of FIG. 2.

Supported on the upper structure of grader B are a series of crossbars 62, 63, 64, 65, 66, 67, 68, 69 and 70, on which are supported photo-electric cells like that shown in FIG. 4 and having a structure like that described as in FIG. 3. These photo-electric cells are mounted over belts 47 and 56.

The photo-electric cell and light therefor project downwardly at an angle and thus grade the product as to color or defect. The defect in the product may be caused by sunburn, rot, cut cause by the digging machine, scab or any other injury which shows on the product.

Figure 8:
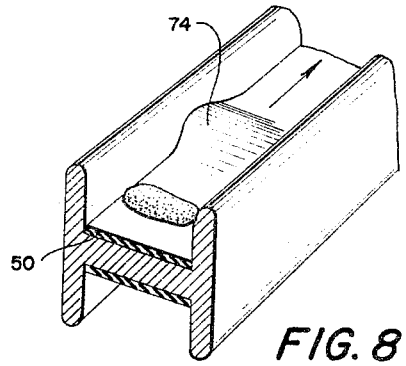
FIG. 8 is a section of one of the supports for the sizing belts with a projection thereon over which the belt traverses to turn the photo being graded.

As is shown in FIG. 8 of the drawings, under the path of each of the belts 47 and 56 inclusive, near the rear exit end of the machine, is a raised projection 74 over which said belts ride. The projection is under only one side of the belt to turn over the products on the belt being examined so that the same can be scanned by the next photo-electric cell of the type shown in FIG. 4. This arrangement allows the product to be examined on two elongated sides for defects.

Under the path of each of the belts 47 to 56 is a series of belts running at right angles thereto, said belts being numbered 75, 76 and 77 and shown in detail in FIG. 1.

Said belts 75, 76 and 77 are mounted on pulleys, said pulleys being mounted on shaft 80. The shaft 80 on which said pulleys are mounted is driven by an end pulley 81 driven by a belt 82 powered by the end pulley 83 mounted at the end of the drive shaft of motor 84, said motor 84 being mounted on a bracket 85 supported on upright 37 of the frame.

Said belts 75, 76 and 77 receive the rejected products from the belts 47 to 56 and discharge said products on a belt 78 entrained at right angles to said belt. The non-rejected products continue on belts 47 to 56 and are discharged in boxes or containers 79 behind said belts and in an extenuation thereof.

The photo-electric cell arrangement shown in FIGS. 3, 4 and 5, operates through an amplifier 71, a solenoid 72 and a kick-off mechanism 73 which removes the product from the belt to another belt when the same falls in the settting of the arrangement of the photo-electric cell.

The grader and sizer should be enclosed in a housing in which extraneous light does not disturb the light of the photo-electric cell arrangement of these devices.

Potatoes are generally sized prior to entering a grading and sizing machine in that the run of the field is sieved over a screening which eliminates the very small potatoes and therefore only the larger size potatoes are passed through the grading and sizing machine.

Having thus described our invention, what we claim as new and desire to secure by U.S. Letters Patent, is:

1. In a sizing, grading and sorting device, the combination of a power belt feed thereto for products to be sized and graded, the first series of power belts at right angles to said power belt feed, fingers of progressive length extending over the power belt feed to remove products from said belt to said first series of power belts, photoelectric cells mounted above the series of power belts with means for adjusting the height of the photo-electric cell over said series of belts, and means controlled by said photo-electric cells for selectively discharging products from said series of belts.

2. The structure according to claim 1, in which the photo-electric cells operate kick-off mechanisms to discharge the products being sized on a second series of live belts positioned below said first series of belts and at right angles thereto.

3. The structure according to claim 2 in which the photo-electric cells and the kick-off mechanism operated thereby are positioned above said first series of power belts in a decreasing height from the power belt feed to said first series of belts.

4. The structure according to claim 2 in which the second series of live belts discharge the graded product on to a third series of live belts positioned below the discharge end of a second series of live belts but positioned in an extension thereof.

5. The structure according to claim 4 in which adjustable photo-electric cells are mounted over said third series of live belts and projected at an angle to the product on said belts.

6. The structure according to claim 5 in which the third series of live belts travel over a raised projection on one side thereof.

7. The structure according to claim 5 in which the third series of live belts discharge products being graded on live belts travelling at right angles below said third series of live belts.

8. The structure according to claim 6 in which the sized and grade products of a like quality are discharged into separate containers.

References Cited by the Examiner

UNITED STATES PATENTS

| | | | |
|---|---|---|---|
| 860,936 | 7/1907 | Norkewitz | 198—42 X |
| 1,256,294 | 2/1918 | Campbell | 198—42 X |
| 1,693,014 | 11/1928 | Anderson | 198—42 X |
| 2,063,485 | 12/1936 | Carris | 209—111.6 |
| 3,144,926 | 8/1964 | Edelman | 209—111.7 X |

FOREIGN PATENTS 1,253,939   1/1961   France.

M. HENSON WOOD, Jr., *Primary Examiner.*

A. N. KNOWLES, *Assistant Examiner.*